Figure 1:
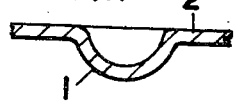

Jan. 22, 1957  G. TAUNTON  2,778,171
PRODUCTION OF AIR-TIGHT PACKAGES
Filed Feb. 26, 1953  3 Sheets-Sheet 1

INVENTOR:
GERALD TAUNTON
BY

Jan. 22, 1957 G. TAUNTON 2,778,171
PRODUCTION OF AIR-TIGHT PACKAGES
Filed Feb. 26, 1953 3 Sheets-Sheet 2
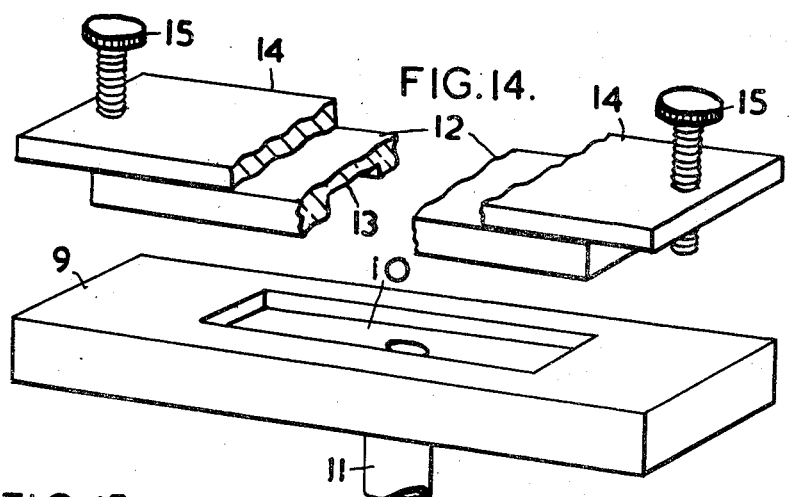
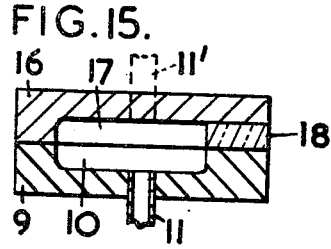
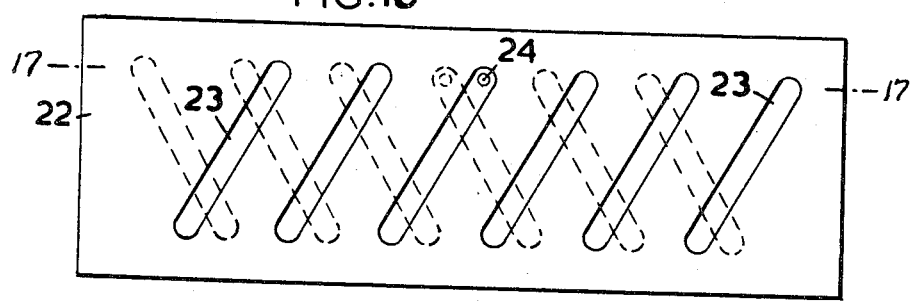
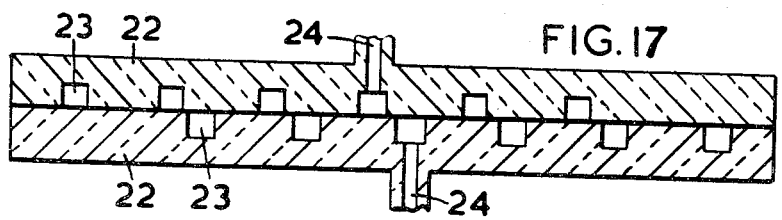
INVENTOR:
GERALD TAUNTON
BY:

Jan. 22, 1957  G. TAUNTON  2,778,171
PRODUCTION OF AIR-TIGHT PACKAGES
Filed Feb. 26, 1953  3 Sheets-Sheet 3
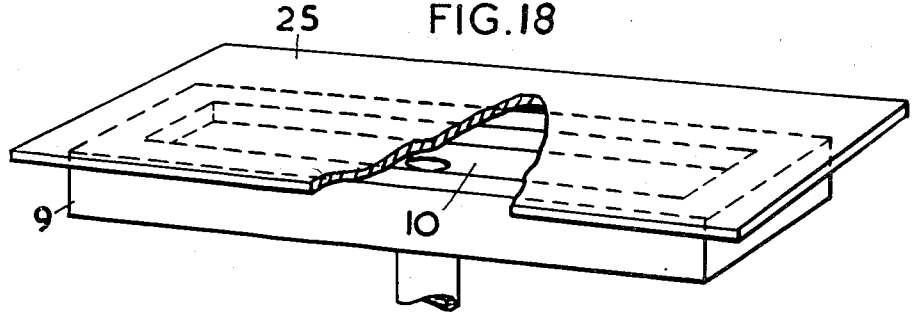
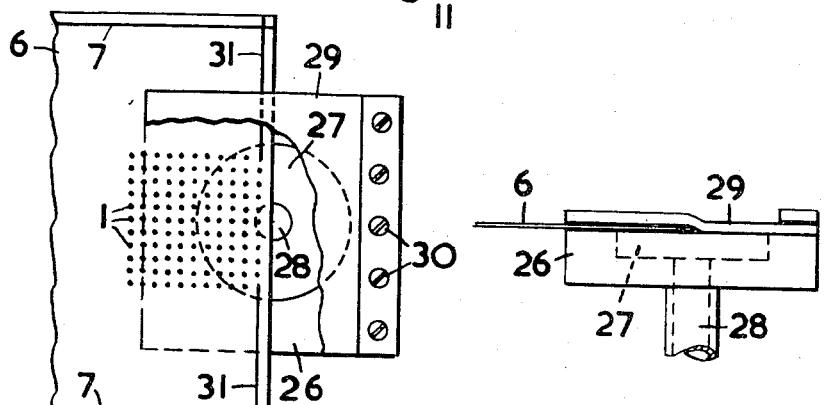
INVENTOR
GERALD TAUNTON
BY

United States Patent Office 2,778,171
Patented Jan. 22, 1957

2,778,171

PRODUCTION OF AIR-TIGHT PACKAGES

Gerald Taunton, Wells, England, assignor to The Wilts United Dairies Limited, Trowbridge, England, a British company Application February 26, 1953, Serial No. 339,017

Claims priority, application Great Britain April 7, 1952

12 Claims. (Cl. 53—9)

This invention relates to the production of airtight packages and in particular to means for facilitating the evacuation of the same.

It has already been proposed to pack cheese and other commodities in flexible oxygen-proof containers and to remove part or all of the air from the container before it is sealed or after it is sealed.

One method of extracting air from a sealed container of flexible oxygen-proof material is by piercing a hole or slit in the material of the sealed container, withdrawing air from the container through said hole or slit and sealing said hole or slit off from the interior of the container.

In another method, a suction member is inserted into the container through the open end of the same, air is withdrawn from the package through said suction member and the open end of the container is then sealed; this method is not entirely satisfactory because it is difficult to prevent access of air to the container around the suction member and also because there is a tendency for the material of the container to be drawn together so that the container becomes flattened in the neighbourhood of the suction member and thus renders efficient withdrawal of air difficult.

In my copending application Serial No. 243,515 titled Airtight Packages filed August 24, 1951, there is described a method of evacuating a flexible, airtight completely sealed package in which a wall of the package is pierced and air extracted therefrom through a suction tool. The pierced wall of the package is provided with projections on the inner surface thereof which form passages to the interior of the package. Further investigation by the applicant has led to the present invention in which the piercing of the wall of the package is unnecessary and in which the package can be evacuated through the open end thereof.

According to the present invention a method of producing a flexible airtight sealed package of oxygen-proof material containing a commodity comprises the steps of forming a pouch of flexible oxygen-proof material having at least part of one end open, providing projections within the pouch adjacent said open end before or after the pouch is formed, withdrawing air through said open end and sealing the pouch between said open end and the commodity.

The pouch may be formed from any suitable flexible oxygen-proof material. Examples of suitable material are waxed sheet material, suitably coated cellulose acetate film, suitably coated regenerated cellulose film, rubber hydrochloride film which is a rubber hydrochloride film, polyvinyl films, metal foil, and laminated materials such as polyethylene-cellulose acetate, polyethylene-regenerated cellulose, or triple laminates.

It is preferred to use a material of which the inner faces can be sealed together by the application of heat and/or pressure in known manner, but this is not essential and if desired suitable adhesives may be used to effect the seal.

For the sake of convenience, all the said materials will be hereinafter referred to as "filmic material."

The provision of the projections may be carried out at any stage prior to evacuation. Thus a blank of filmic material may be provided with projections at one end (or both ends), for example by compression between coacting dies having suitable recesses and projections or between one die and a resilient surface, or by laminating or by a printing process, and the blank then formed into a pouch having one end or part of one end open and with the projections located adjacent the open end, for example by folding. The pouch may also be formed by sealing together two or more blanks without folding; only one of these blanks may be provided with projections. A continuous web or tube of filmic material may also be provided with projections at suitable places before being cut to form blanks.

Alternatively, the blank, blanks, web or tube may be first formed into an open-ended pouch and the projections then formed on the material of the pouch adjacent the open end.

As a further alternative, the open-ended pouch may be provided with the necessary projections by the insertion into the open end of the pouch of a separate piece of filmic material, or other material, which has been provided with projections. This separate piece of material may be caused to adhere to the material of the pouch or it may remain unattached thereto.

The projections may take any desired form. For example they may be in the form of a plurality of substantially hemispherical, conical or pyramidal protuberances, or of a plurality of ridges which may be in the form of parallel or radiating, straight, curved or zig-zag lines. They may be provided in any suitable way, for example by the use of dies, by folding, by laminating or by printing as already described. When the material is thermoplastic, the dies may be heated.

The projections should preferably extend from the extreme edge of the open end or from a point adjacent said edge inwardly to a point adjacent the commodity to be packed. They may extend across the whole width of the pouch or be confined to a part or parts of said width.

When the commodity to be packed is of a pulverulent or granular nature, the distance between adjacent projections is preferably less than the size of the individual particles of the commodity so that, while the projections permit free passage of air between them, they prevent the passage of the commodity itself, thus forming a kind of strainer or filter which prevents the commodity from being drawn into the suction source.

Irrespective of the nature of the commodity, the projections are preferably arranged close together if the open end of the pouch is to be subjected to appreciable pressure during evacuation, because the close arrangement of the projections offers greater resistance to flattening by the applied pressure.

The projections provide a plurality of air passages leading inwardly into the pouch and prevent the walls of the pouch from being flattened together and thereby retard or prevent the evacuation of the pouch through the open end thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figures 1 to 4 of the accompanying drawings show on an enlarged scale some possible forms of projections, each of these figures being in section;

Figures 5 to 13 show various arrangements of projections according to the present invention; and Figures 14 to 20 show various preferred embodiments of an apparatus for carrying out the process of the present invention.

Referring now to the drawings, and to Figure 1 thereof in particular, there is shown a preferred configuration which may be imparted to the projections. As may readily be seen from the figure, the protuberance of ridge 1 is hemispherical and may be formed by pressing the filmic material 2 between dies.

Figure 2:
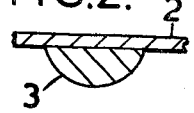

Figure 2 shows a hemispherical protuberance or ridge 3 which has been applied to the filmic material 2 by laminating or printing.

Figure 3:
Figure 4:

Figures 3 and 4 are similar to Figures 1 and 2, respectively, but show a pyramidal protuberance or triangular ridge 4 or 5.

Figure 5:
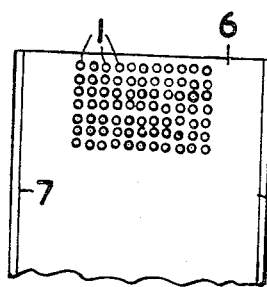
Figure 6:
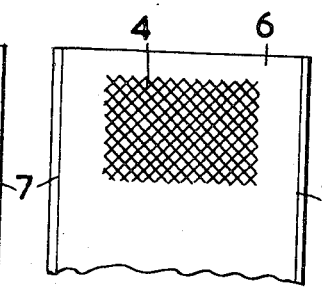
Figure 7:
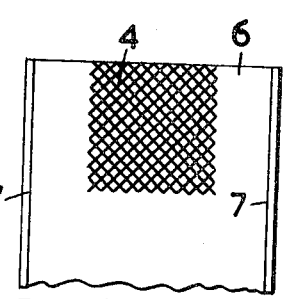
Figure 8:
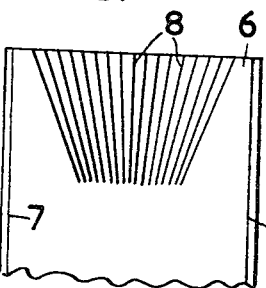
Figure 9:
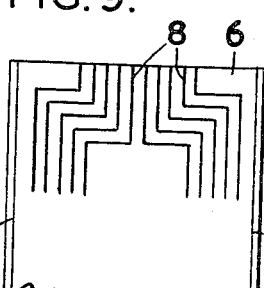
Figure 10:
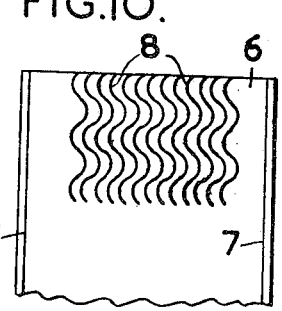
Figure 11:
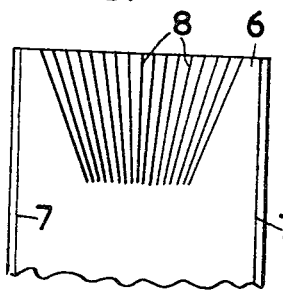
Figure 12:
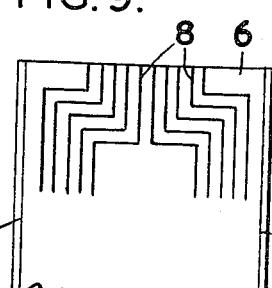
Figure 13:
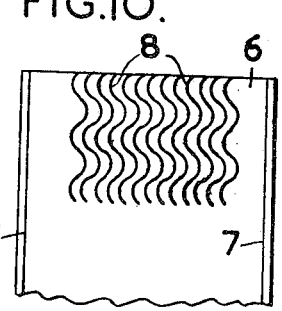

Referring now to Figures 5 to 13 of the accompanying drawings, which are purely diagrammatic, the same show by way of example (and not by way of limitation) various arrangements of projections according to the invention. Each of the Figures 5 to 13 shows the open end of a pouch 6 formed by sealing together at 7, adjacent the edges, two pieces of filmic material (which may be two separate blanks or the two parts of a folded blank). In Figure 5 the projections take the form of hemispherical protuberances 1 which occupy an area extending inwardly from the open end of the pouch and laterally spaced from the side edges thereof. If desired the protuberances 1 may extend laterally to the side edges of the pouch and/or may commence at a point spaced from the open end of the pouch. In Figures 6, 7 and 8, the projections take the form of pyramidal protuberances 4 arranged in rows, said rows being diagonal in Figures 6 and 7 and parallel to the edges of the pouch in Figure 8. In Figures 9 to 13 the projections take the form of ridges 8 which in Figure 9 are straight lines parallel with the sides of the pouch, in Figure 10 are zig-zag lines, in Figure 11 are radiating lines, in Figure 12 are lines each bent twice at right angles, and in Figure 13 are undulating lines. Any other arrangement of projections which will provide air passages from the interior of the pouch to a point adjacent the open end of the pouch may also be used.

The invention also includes apparatus for carrying out the described method, said apparatus comprising means for withdrawing air through the open end of a pouch and means (of a kind known per se) for sealing the pouch between the open end and the commodity therein after complete or partial evacuation.

As set forth above, various forms of apparatus according to this invention are shown diagrammatically, by way of example, in Figures 14 to 20 of the accompanying drawings.

Figure 14 is a perspective view, with parts broken away, of one embodiment of apparatus according to the invention. The apparatus comprises a lower jaw 9 provided with a recess 10 in its upper face, said recess communicating with a suction source by means of a pipe 11; and an upper jaw composed of a slab 12 of resilient material having a recess 13 in its lower face, said slab 12 being secured to a plate 14 provided with stop screws 15. The axial positions of these screws control the minimum spacing between the jaws, it being clear that when the lower free ends of the screws 15 extend below the lower surface of the jaw 12, these free ends will, as the jaws 9 and 12 are brought toward each other, physically abut the upper surface of the jaw 9 before the jaws can come into engagement with each other. In this way, the jaws will be maintained spaced from each other, and this spacing can be varied simply by turning the screws 15 so as to move their free ends in axial direction. In operation, the pouch is located between the two jaws, the latter then being closed so that the open end of the pouch is located within the two recesses 10 and 13 and therefore in communication with the suction source. The pipe 11 may be provided with a suitable valve so that the recess 10 is cut off from the suction source until after the jaws have been closed. The closing of the jaws may be effected by moving the lower jaw upwardly, by moving the upper jaw downwardly, or by moving both jaws towards each other. The stop screws 15 are adjusted so that when the jaws are pressed together the pressure exerted by the resilient slab 12 on the jaw 9 is sufficient to ensure that air cannot pass between them around the pouch into the recesses 10 and 13, but is insufficient to cause flattening of the projections within the pouch.

After the pouch has been evacuated to the desired extent, the pouch is sealed by conventional sealing means, as for example by the application of heat and pressure, and if desired said sealing means may be incorporated in one or other or both of the jaws.

Figure 15 is a section through a further embodiment in which the lower jaw 9, with its recess 10 and suction pipe 11, is similar to the lower jaw of Figure 14, but in which the upper jaw is formed by a plate 16, having a recess 17, one edge of the plate being cut away for the reception of a strip 18 of resilient material, such as rubber, which is secured thereto in suitable manner. Instead of, or additionally to, the suction pipe 11, a similar suction pipe 11', indicated by dotted lines, may be provided in the upper jaw.

Figures 16 and 17 are, respectively, a plan of the lower jaw and a section, taken on the line 17—17 of Figure 16, of the two jaws in another embodiment. The two jaws are identical in shape and each consists of a slab 22 of resilient material provided with a plurality of recesses 23 arranged at an angle to the edges of the slab and also provided with a pipe 24 which communicates with one of the recesses 23. Both jaws may be identical mouldings in rubber or other resilient plastic material. When the jaws are brought together, the recesses in one jaw intersect those in the other jaw (as indicated by dotted lines in Figure 16) so that if either or both of the pipes 24 is connected to a suction source, such as a vacuum pump, the suction is applied to all the recesses. The pouch to be evacuated is laid between the jaws in such a position that the open end of the pouch (and the projections provided adjacent the same) lie along a line intermediate the ends of the recesses. Where it is desirable to introduce into the evacuated pouch a small amount of another gas, such as carbon dioxide, it is possible to connect one of the pipes 24 to a supply of such other gas and the other pipe 24 to a source of suction, so that after evacuation has been carried out to the desired extent a valve in the pipe 24 leading to the suction source may be closed and a valve in the pipe 24 leading to the supply of gas opened to admit the desired amount of gas. The introduction of gas may also be effected before evacuation or between two evacuation steps; by this latter alternative the small amount of residual oxygen remaining after the first evacuation step is diluted by the introduced gas so that the amount of oxygen remaining after the second evacuation step is extremely small. Conventional heat-sealing means may be provided in one of the jaws 22 along the front edge thereof. The embodiment shown in Figures 16 and 17 has the advantage that the pressure exerted on the pouch is more evenly distributed than in the embodiments of Figures 14 and 15 and that consequently there is less liability for the projections to be flattened.

Figure 18 is a perspective view, with part broken away, of a further embodiment in which the lower jaw 9 has a recess 10 and suction pipe 11 as in Figure 14, but in which the upper jaw is replaced by a sheet of flexible material, such as rubber, which is drawn down onto the jaw 9 and onto the open end of the pouch laid thereon by the suction applied through pipe 11.

Figures 19 and 20 are a plan and end elevation, respectively, of a further embodiment similar to that in Figure 18. Referring to Figures 19 and 20, the apparatus comprises a plate 26 having a circular recess 27 in its upper face and a suction pipe 28 communicating with said recess, and a sheet 29 of flexible material secured by means of screws 30 along one edge of the plate 26. An open-ended pouch 6, sealed along its two side edges at 7 and sealed along parts of its front edge at 31, and also provided with rows of protuberances 1 is laid on the plate 26 in such a position that the open portion of the pouch is over the recess 27 and the protuberances 1 extend beyond the edge of the plate 26 in a direction away from the recess 27. The resilient flap 29 is then laid over the pouch, as shown, and suction is applied by means of the pipe 28. The suction draws down the flap 29 so that it closely embraces the plate 26 and the pouch 6, thereby preventing atmospheric air from being drawn into the recess. The protuberances 1 provide between them passages through which air within the pouch may pass to the recess 27 for evacuation of the pouch.

Where apparatus comprising a recess is used, the pouch to be evacuated is positioned so that the open end thereof at least reaches the edge of the recess and preferably so that it projects beyond it into the recess. Where the projections do not extend to the edge of the pouch, the pouch should be positioned so that the projections at least reach the edge of the recess. The length of the recess may be less than, equal to, or greater than the width of the open end of the pouch.

At least that part of the face of one or both jaws which comes into contact with the pouch is preferably resilient so that the projections are not flattened. Where a high vacuum is not desired within the pouch, the remainder of the face of the jaw or jaws need not be resilient; in other cases, however, it is preferable to provide a resilient facing surrounding the recess either on one or both jaws. The resilient surface which contacts the pouch may be of greater resiliency than the remainder of the resilient surface. Suitable resilient surfaces are sponge rubber, narrow strips of rubber or rubber tubing (which may be inflated).

As already mentioned, the apparatus may be provided with separate or integral sealing means for the pouch. The sealing means may be coacting tools, one or both of which may be heated, said tools being adapted to grip the pouch between the open end and the commodity therein and to seal the walls of the pouch together. In the case of apparatus comprising jaws, the said sealing means may be carried by said jaws.

The apparatus may also be provided with means for stretching the open end of the pouch at any stage prior to sealing in order to avoid or remove folds or wrinkles therein and for holding the pouch in the stretched condition until it has been sealed. This may be effected for example by gripping the pouch adjacent its open end between rubber faces which are then stretched.

The apparatus may also comprise means for bringing the projections into contact with another inner face of the material of the pouch between the commodity therein and the site for the seal, either before or coincident with the application of suction to the pouch.

The apparatus may also be adapted for the introduction of gas into the pouch, with or without previous and/or subsequent evacuation thereof.

I claim:

1. A method of evacuating an envelope comprising the steps of forming an envelope consisting of a flexible, fluid-tight sheet material having along an edge of said envelope two overlying sheet portions having edges forming an opening in said envelope, providing at least one of said sheet portions at the face thereof directed toward the other sheet portion with a plurality of spacing projections forming between said overlying sheet portions a passage communicating with said opening; and evacuating the interior of said envelope through said opening and said passages formed by said projections between said sheet portions.

2. A fluid-tight packaging process comprising the steps of forming an envelope consisting of a flexible, fluid-tight sheet material having along an edge of said envelope two overlying sheet portions having edges forming an opening in said envelope, providing at least one of said sheet portions at the face thereof directed toward the other sheet portion with a plurality of spacing projections forming between said overlying sheet portions a passage communicating with said opening; evacuating the interior of said envelope through said opening and said passages formed by said projections between said sheet portions; and sealing said opening.

3. A fluid-tight packaging process comprising the steps of forming an envelope consisting of a flexible, fluid-tight sheet material having along an edge of said envelope two overlying sheet portions having edges forming an opening in said envelope, providing at least one of said sheet portions at the face thereof directed toward the other sheet portion with a plurality of spacing projections forming between said overlying sheet portions a passage communicating with said opening; removing fluid from the interior of said envelope through said opening and said passages formed by said projections between said sheet portions; adding a preserving gas to said envelope; and sealing said opening.

4. Apparatus for evacuating a container formed of flexible, sheet material impervious to air having an open end and formed with projections on an inner surface thereof adjacent said open end so as to define with an inner surface of said container opposite said projections passageways to the interior of said container when the open end thereof is pressed together comprising, in combination, a pair of engageable jaw members, at least one of which is resilient, each of said jaw members being formed with a plurality of recesses in the engaging face thereof so as to form a continuous evacuating chamber when said jaw members are engaged; and means communicating with one of said recesses for evacuating said chamber, whereby when the container is firmly grasped between said jaws and the open end of said container opens into said chamber, said jaws form with the exterior surface of said container an air-tight seal and evacuating said chamber causes air from the interior of said container to be withdrawn through said passageways and said open end.

5. A container and an apparatus for evacuating the same comprising, in combination, a container consisting of a flexible, air-impervious sheet material having along an edge of said container two overlying sheet portions having edges forming an opening in said container, at least one of said two sheet portions having at the faces thereof directed toward the other sheet portion a plurality of spacing projections adjacent said opening forming between said overlying sheet portions a passage communicating with said opening; a pair of engageable jaw members, at least one of which is resilient, defining therebetween when in engaged position an evacuating chamber; and means communicating with said chamber for evacuating the same, whereby when said container is grasped between said jaw members with said opening in said container opening into said chamber said jaw members form with the exterior surface of said container an air-tight seal, and evacuating said chamber causes air from the interior of said container to be withdrawn through said passage and said opening.

6. Apparatus for evacuating a container comprising, in combination, a pair of engageable jaw members defining therebetween when in engaged position a closed evacuating chamber, at least one of said jaw members having a resilient edge portion adapted fluid-tightly to engage the container; stop means operatively associated with at least one of said jaw members for adjusting the minimum spacing of said jaw members; and means communicating with said chamber for evacuating the same while said resilient edge portion of said one jaw member fluid-tightly engages the container.

7. A method of evacuating a container formed of flexible sheet material impervious to air and having at least a partially open end, comprising the steps of providing spacing projections on an inner surface of said container adjacent said partially open end thereof; clasping said partially open end of said container between a pair of engageable jaws so as to press the same together and form between the outer surface of said container and said jaws an air-tight seal, forming with the inner surface of said container opposite and touching said projections when said open end is pressed together passages through which air may be withdrawn from within said container; and withdrawing air through said partially open end and said passages so as to at least partially evacuate said container.

8. A method of evacuating a container formed of flexible sheet material impervious to air and having at least a partially open end, comprising the steps of providing spacing projections on an inner surface of said container adjacent said partially open end thereof; clasping said partially open end of said container between a pair of engageable jaws at least one of which is resilient so as to press the same together and form between the outer surface of said container and said jaws an air-tight seal, forming with the inner surface of said container opposite and touching said projections when said open end is pressed together passages through which air may be withdrawn from within said container; and withdrawing air through said partially open end and said passages so as to at least partially evacuate said container.

9. An air-tight packaging process comprising the steps of forming a container of flexible sheet material impervious to air and having at least a partially open end; providing spacing projections on an inner surface of said container adjacent said partially open end thereof; clasping said partially open end of said container between a pair of engageable jaws at least one of which is resilient so as to press the same together and form between the outer surface of said container and said jaws an air-tight seal, forming with the inner surface of said container opposite and touching said projections when said open end is pressed together passages through which air may be withdrawn from within said container; withdrawing air through said partially open end and said passages so as to at least partially evacuate said container; and sealing said opening.

10. An air-tight packaging process comprising the steps of forming a container of flexible sheet material impervious to air and having at least a partially open end; providing spacing projections on an inner surface of said container adjacent said partially open end thereof; clasping said partially open end of said container between a pair of engageable jaws at least one of which is resilient so as to press the same together and form between the outer surface of said container and said jaws an air-tight seal, forming with the inner surface of said container opposite and touching said projections when said open end is pressed together passages through which air may be withdrawn from within said container; withdrawing air through said partially open end and said passages so as to at least partially evacuate said container; adding a preserving gas to said container through said partially open end and said passages; and sealing said open end of said container.

11. A method of evacuating a container formed of flexible sheet material impervious to air and having at least a partially open end, comprising the steps of compressing said material between a pair of coacting dies so as to provide spacing projections on an inner surface of said container adjacent said partially open end thereof; clasping said partially open end of said container between a pair of engageable jaws so as to press the same together and form between the outer surface of said container and said jaws an air-tight seal, forming with the inner surface of said container opposite and touching said projections when said open end is pressed together passages through which air may be withdrawn from within said container; and withdrawing air through said partially open end and said passages so as to at least partially evacuate said container.

12. A method of evacuating a container formed of flexible sheet material impervious to air and having at least a partially open end, comprising the steps of laminating a pattern on said material so as to provide spacing projections on an inner surface of said container adjacent said partially open end thereof; clasping said partially open end of said container between a pair of engageable jaws so as to press the same together and form between the outer surface of said container and said jaws an air-tight seal, forming with the inner surface of said container opposite and touching said projections when said open end is pressed together passages through which air may be withdrawn from within said container; and withdrawing air through said partially open end and said passages so as to at least partially evacuate said container.

References Cited in the file of this patent

UNITED STATES PATENTS

| | | |
|---|---|---|
| 2,281,187 | Waters | Apr. 28, 1942 |
| 2,559,368 | Pancratz | July 3, 1951 |
| 2,601,020 | Hopp | June 17, 1952 |
| 2,676,440 | Campbell | Apr. 27, 1954 |